United States Patent
Lorenzo et al.

(10) Patent No.: US 10,260,842 B2
(45) Date of Patent: Apr. 16, 2019

(54) LIGHTWEIGHT BLAST-MITIGATING POLYCARBONATE-BASED LAMINATE SYSTEM

(71) Applicant: Plaskolite Massachusetts, LLC, Columbus, OH (US)

(72) Inventors: James M. Lorenzo, Mars, PA (US); Isaac Platte, Pittsburgh, PA (US); Jessica Boyer, Coraopolis, PA (US); Robert A. Pyles, Bethel Park, PA (US)

(73) Assignee: Plaskolite Massachusetts, LLC, Columbus, OH (US)

( * ) Notice: Subject to any disclaimer, the term of this patent is extended or adjusted under 35 U.S.C. 154(b) by 0 days.

(21) Appl. No.: 15/540,117

(22) PCT Filed: Feb. 9, 2016

(86) PCT No.: PCT/US2016/017070
§ 371 (c)(1),
(2) Date: Jun. 27, 2017

(87) PCT Pub. No.: WO2016/130499
PCT Pub. Date: Aug. 18, 2016

(65) Prior Publication Data
US 2017/0370680 A1 Dec. 28, 2017

Related U.S. Application Data

(60) Provisional application No. 62/113,848, filed on Feb. 9, 2015.

(51) Int. Cl.
*F41H 5/04* (2006.01)
*B32B 17/10* (2006.01)
(Continued)

(52) U.S. Cl.
CPC ......... *F41H 5/0407* (2013.01); *B32B 17/064* (2013.01); *B32B 17/10018* (2013.01);
(Continued)

(58) Field of Classification Search
None
See application file for complete search history.

(56) References Cited

U.S. PATENT DOCUMENTS

| | | |
|---|---|---|
| 2,991,273 A | 7/1961 | Hechelhammer et al. |
| 2,999,835 A | 9/1961 | Goldberg |

(Continued)

FOREIGN PATENT DOCUMENTS

| | | | | |
|---|---|---|---|---|
| CA | 2362741 A1 * | 9/2000 | ....... | B32B 17/10293 |
| DE | 4415878 A1 | 11/1995 | | |

(Continued)

OTHER PUBLICATIONS

H. Schnell, "Chemistry and Physics of Polycarbonates", Interscience Publishers, New York, New York, 1964. pp. 28-102.

*Primary Examiner* — Stephen Johnson

(57) ABSTRACT

The present invention provides a lightweight blast-mitigating polycarbonate laminate system comprising at least one polycarbonate sheet, a portion of which is laminated to a glass layer having a thickness between 0.25 times and less than 1 times the thickness of the polycarbonate sheet. The laminate system may further include fasteners to attach the system to a building, positioned to prevent the laminate system from breaking or detaching in case of a blast event.

10 Claims, 4 Drawing Sheets

(51) Int. Cl.
  *B32B 17/06* (2006.01)
  *B32B 27/36* (2006.01)

(52) U.S. Cl.
  CPC ...... *B32B 17/10752* (2013.01); *B32B 27/365* (2013.01); *B32B 2369/00* (2013.01)

(56) References Cited

U.S. PATENT DOCUMENTS

| | | |
|---|---|---|
| 2,999,846 A | 9/1961 | Schnell et al. |
| 3,028,356 A | 4/1962 | Shepard |
| 3,028,365 A | 4/1962 | Schnell et al. |
| 3,036,036 A | 5/1962 | Howe |
| 3,148,172 A | 9/1964 | Fox |
| 3,153,008 A | 10/1964 | Fox |
| 3,271,367 A | 9/1966 | Schnell et al. |
| 3,544,514 A | 12/1970 | Schnell et al. |
| 3,879,347 A | 4/1975 | Serini et al. |
| 3,890,266 A | 6/1975 | Serini et al. |
| 3,912,688 A | 10/1975 | Schiller et al. |
| 4,210,741 A | 7/1980 | Baggett |
| 4,861,666 A | 8/1989 | LeGrand et al. |
| 4,985,099 A | 1/1991 | Mertens et al. |
| 5,086,157 A | 2/1992 | Reuter et al. |
| 5,104,723 A | 4/1992 | Freitag et al. |
| 5,105,004 A | 4/1992 | Reuter et al. |
| 5,109,076 A | 4/1992 | Freitag et al. |
| 5,126,428 A | 6/1992 | Freitag et al. |
| 5,401,826 A | 3/1995 | Sakashita et al. |
| 5,589,272 A | 12/1996 | Braun et al. |
| 2008/0092730 A1* | 4/2008 | Hall .......................... E04H 9/10 89/36.04 |
| 2010/0024692 A1 | 2/2010 | Bar |
| 2013/0302581 A1* | 11/2013 | Mannheim Astete ...................... B32B 17/10064 428/214 |
| 2015/0202845 A1* | 7/2015 | Cherekdjian ..... B32B 17/10045 428/215 |

FOREIGN PATENT DOCUMENTS

| | | |
|---|---|---|
| DE | 102012210906 A1 | 1/2014 |
| FR | 2869605 A1 | 11/2005 |
| GB | 885442 | 12/1961 |
| GB | 1079821 | 8/1967 |
| GB | 1122003 | 7/1968 |
| GB | 1229482 | 4/1971 |
| GB | 1341318 | 12/1973 |
| GB | 1367788 A | 9/1974 |
| GB | 1367790 | 9/1974 |
| GB | 1368338 | 9/1974 |
| GB | 2 371 587 A | 7/2002 |
| WO | 8404277 A1 | 11/1984 |

* cited by examiner

LIGHTWEIGHT BLAST-MITIGATING POLYCARBONATE-BASED LAMINATE SYSTEM

CROSS REFERENCE TO RELATED APPLICATIONS

This application is a national stage application under 35 USC § 371 of PCT/US2016/017070, filed Feb. 9, 2016, which claims the benefit of U.S. Provisional Application No. 62/113,848, filed Feb. 9, 2015, both of which are incorporated herein by reference.

FIELD OF THE INVENTION

The present invention relates to a blast-mitigating system and in particular to a lightweight blast-mitigating polycarbonate laminating system comprising at least one polycarbonate panel.

BRIEF DESCRIPTION OF THE FIGURES

The present invention will now be described for purposes of illustration and not limitation in conjunction with the figures, wherein.

DESCRIPTION OF THE INVENTION

Figure 1:
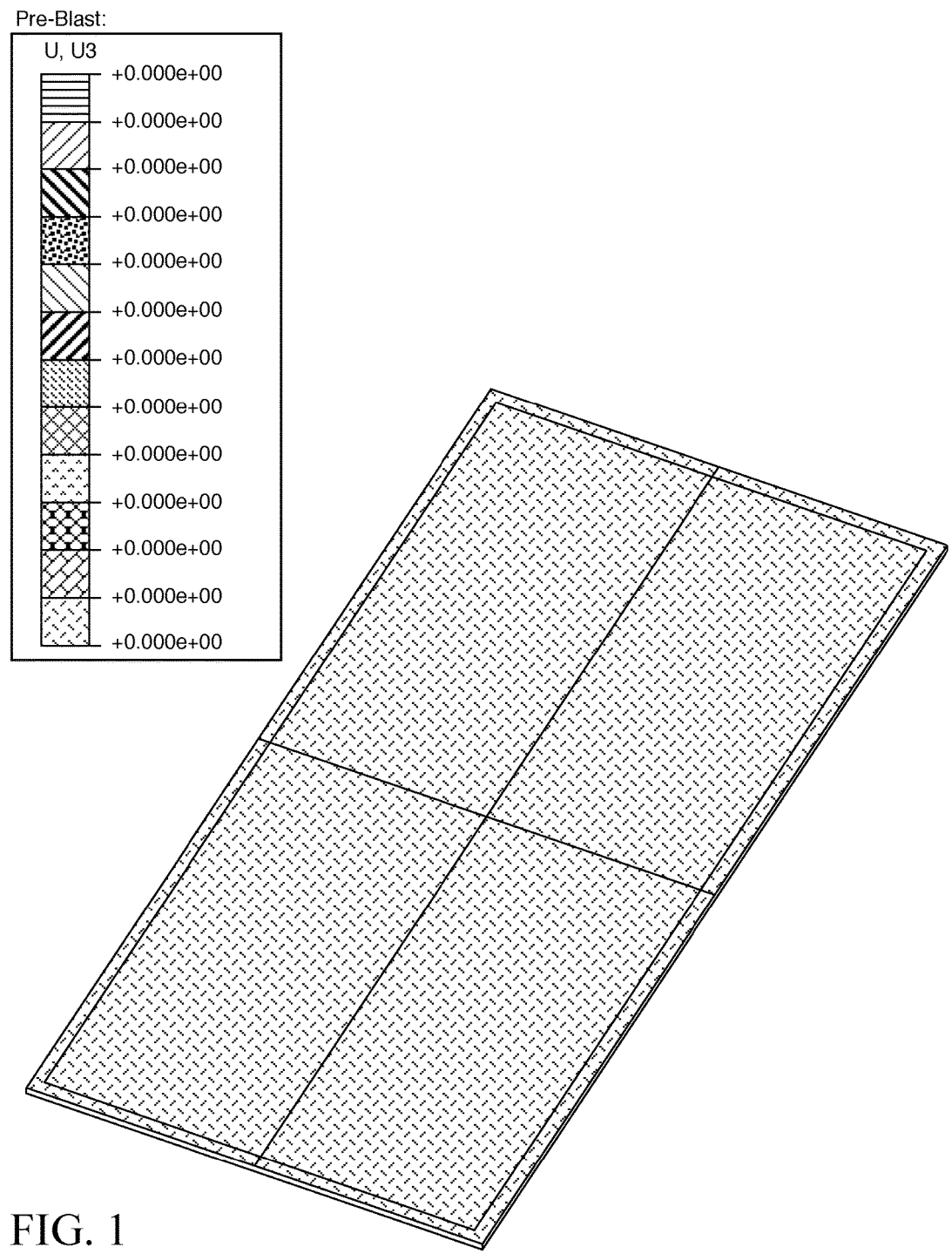
FIG. 1 shows a computer simulation of the laminate system of the present invention, wherein bolts are attached to the panel to keep it in place, before the system is subject to a simulated blast event.

Several different systems are described herein, which may be attached as panels to a building to impart blast and/or ballistics resistance to it, to prevent significant damage to the building and its occupants. The inventive panels comprise at least one monolithic, preferably two or more superposed polycarbonate sheets that are laminated and/or adhesively bonded one to the other to form a laminate.

The polycarbonate sheets useful in the inventive structural insulated panel are preferably transparent, but the present inventors contemplate situations where they may be translucent, or opaque. Suitable polycarbonate resins for preparing the sheets useful in the structural insulated panel of the present invention are homopolycarbonates and copolycarbonates, both linear or branched resins and mixtures thereof.

The polycarbonates have a weight average molecular weight of preferably 10,000 to 200,000, more preferably 20,000 to 80,000 and their melt flow rate, per ASTM D-1238 at 300° C., is preferably 1 to 65 g/10 min., m ore preferably 2 to 35 g/10 min. They may be prepared, for example, by the known diphasic interface process from a carbonic acid derivative such as phosgene and dihydroxy compounds by polycondensation (See, German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964).

In the present context, dihydroxy compounds suitable for the preparation of the polycarbonates of the invention conform to the structural formulae (1) or (2) below.

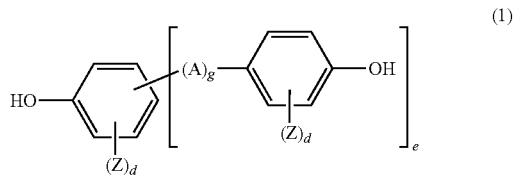

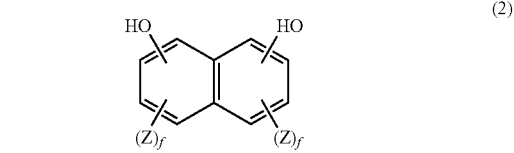

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$ or a radical conforming to (3)

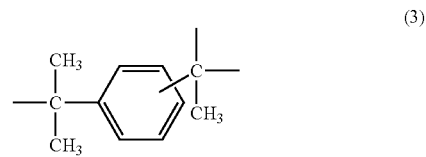

e and g both denote the number 0 to 1;
Z denotes F, Cl, Br or C1-C4-alkyl and if several Z radicals are substituents in one aryl radical, they may be identical or different from one another;
d denotes an integer of from 0 to 4; and
f denotes an integer of from 0 to 3.

Among the dihydroxy compounds useful in the practice of the invention are hydroquinone, resorcinol, bis-(hydroxyphenyl)-alkanes, bis-(hydroxyl-phenyl)-ethers, bis-(hydroxyphenyl)-ketones, bis-(hydroxyl-phenyl)-sulfoxides, bis-(hydroxyphenyl)-sulfides, bis-(hydroxyphenyl)-sulfones, and α,α-bis-(hydroxyphenyl)-diisopropylbenzenes, as well as their nuclear-alkylated compounds. These and further suitable aromatic dihydroxy compounds are described, for example, in U.S. Pat. Nos. 5,401,826, 5,105,004; 5,126,428; 5,109,076; 5,104,723; 5,086,157; 3,028,356; 2,999,835; 3,148,172; 2,991,273; 3,271,367; and 2,999,846, the contents of which are incorporated herein by reference.

Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxy-phenyl)-p-diisopropylbenzene, 2,2-bis-(3-methyl-4-hydroxyphenyl)-propane, 2,2-bis-(3- chloro-4-hydroxyphenyl)-propane, 4,4'-dihydroxy-diphenyl, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxy-phenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxyphenyl)-p-diisopropyl-benzene and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxy-phenyl)-3,3,5-trimethylcyclohexane. The most preferred bisphenol is 2,2-bis-(4-hydroxyphenyl)-propane (bisphenol A).

The polycarbonates useful in producing the structural insulated panel of the invention may entail in their structure units derived from one or more of the suitable bisphenols.

Among the resins suitable in the practice of the invention are phenolphthalein-based polycarbonate, copolycarbonates and terpoly-carbonates such as are described in U.S. Pat. Nos. 3,036,036 and 4,210,741, both of which are incorporated by reference herein. This incorporation is preferably specific with respect to the structures, constituents and ratio of constituents of the phenolphthalein-based polycarbonates, copolycarbonates and terpolycarbonates.

The polycarbonates useful in preparing the structural insulated panel of the invention may also be branched by condensing therein small quantities, e.g., 0.05 to 2.0 mol % (relative to the bisphenols) of polyhydroxyl compounds. Polycarbonates of this type have been described, for example, in German Offenlegungsschriften 1,570,533; 2,116,974 and 2,113,374; British Patents 885,442 and 1,079,821 and U.S. Pat. No. 3,544,514, which is incorporated herein by reference. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenyl-methane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methyl-phenol; 2,4-dihydroxybenzoic acid; 2-(4-hydroxy-phenyl)-2-(2,4-dihydroxy-phenyl)-propane and 1,4-bis-(4,4'-dihydroxytri-phenylmethyl)-benzene. Some of the other polyfunctional compounds are 2,4-dihydroxy-benzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in U.S. Pat. Nos. 3,028,365; 2,999,846; 3,153,008; and 2,991,273 which are incorporated herein by reference.

The preferred process for the preparation of polycarbonates is the interfacial polycondensation process. Other methods of synthesis in forming the polycarbonates of the invention, such as disclosed in U.S. Pat. No. 3,912,688, incorporated herein by reference, may be used. Suitable polycarbonate resins are available in commerce, for instance, from Covestro LLC, Pittsburgh, Pa., under the MAKROLON trademark. The polycarbonate is preferably used in the form of sheets or films in the inventive structural insulated panel. Suitable polycarbonate sheets are available under the HYGARD trademark, also from Covestro LLC.

The inventive panel may optionally include at least one glass layer to impart additional ballistics resistance. The one or more glass layers may be laminated to or between any two of the polycarbonate sheets. In addition, there may also be an adhesive layer in between the polycarbonate sheet and glass layer. The glass may be added either as an inset, or extended along the entire length and/or width of a polycarbonate layer.

It was previously believed that a minimum of one inch thickness of polycarbonate was required to impart sufficient blast resistance to the system. A thinner and/or lighter panel is desirable, to reduce the overall cost and weight of the panels, and their respective weight loads on the buildings to which they are attached. However, it was not previously known how to achieve a thinner and/or lighter panel made of such materials. As described herein, a thinner and/or lighter panel may be produced that imparts sufficient blast, or blast and ballistics resistance.

In an embodiment of the invention, thinner and lighter layers of both polycarbonate and glass are used in the panel, to achieve a thickness of about ¾ inches to about 13/16 inches (about 1.9 cm to about 2.1 cm) of polycarbonate. One problem encountered in creating such a thin panel, is applying glass across the entire panel. That is because when glass is applied to the polycarbonate and adhesive laminate system, the system may "bow" or warp—that is, the panel would not remain flat. Consequently, the panel cannot be installed in a traditional manner, which perhaps would not meet the minimum required level of blast and ballistics resistance that is required.

However, it has been found that adjusting the ratio of glass thickness to polycarbonate thickness, may solve the problem of bowing or warpage of glass when applied to a polycarbonate and adhesive layer system. In particular, it has been found that using a lower thickness of glass, in proportion to the thickness of polycarbonate, is preferred. Specifically, it has been found that a thickness ratio of about less than 1 to about 0.25 glass/polycarbonate is preferred. In another embodiment of the invention, a thickness ratio of about 0.5 to about 0.7 glass/polycarbonate is also preferred.

It has also been found that minimizing the overall thickness of the panel is important to produce a lightweight blast-mitigating polycarbonate system. Namely, it has been discovered that limiting the overall thickness of a laminate system having a polycarbonate sheet and a glass layer, where the thickness of the glass is less than the thickness of the polycarbonate, should be 2.75 inches (7.0 cm) or less. Laminate systems of this kind, having a thickness of 2.75 inches or less, are considered to be lightweight.

In addition, the panel must still maintain a sufficient amount of polycarbonate and/or glass material to maintain sufficient levels of blast and/or blast and ballistics resistance. In a preferred embodiment of the invention, the panel thickness is about 0.75 inches to about 2.75 inches (about 1.9 cm to about 7.0 cm). In another embodiment of the invention, the panel thickness is about 1.75 inches to about 2.25 inches (about 4.4 cm to about 5.7 cm). In yet another preferred embodiment of the invention, the thickness is about 2.0 inches (about 5.1 cm).

Another problem that has been encountered in attempting to use a thinner panel for blast and ballistics resistance, is the tendency for such panels to become detached from the fasteners that attach the panels to the buildings, and thus failing to protect the buildings to which they are attached. This problem seems to recur, even in the event of stronger bolts or other fasteners being used in association with the panel. It has been discovered that the positioning of such bolts or fasteners can have a surprising effect, upon the ability of the panels to withstand a blast or ballistic attack. In particular, positioning the bolts or other fasteners at a larger distance from the edge of the panel has been found to prevent the panel from detaching from the fasteners upon attack. Specifically, computer modeling of a blast upon a lightweight barrier of the present invention has been proven effective when the bolts or fasteners are located at a distance from the edge of at least 1.1 times the thickness of the panel, preferably 1.1-1.6 times the thickness of the panel, more preferably 1.2-1.5 times the thickness of the panel. In addition, it has also been found that the distance between the bolts or other fasteners should be at least the same distance apart from each other, as they are from the edge of the panel. That is because, as shown in the attached figures, the blast appears to first pull the panel away from the bolts or other fasteners, before the force of the blast would crack the panel enough to dislodge it from the bolts or other fasteners, or disintegrate the panel entirely. It is believed that by re-positioning the bolts or other fasteners in a manner described herein, the panels will be able to withstand a greater amount of blast and/or ballistics force, than what was known or expected in the prior art, for a panel having a polycarbonate thickness of between about ¾ and about 13/16 inches (about 1.9 cm and about 2.1 cm).

In addition, it is believed that combining a panel having layers of both polycarbonate and glass, with the thickness of the glass layer being about 0.25 times to about less than one times the thickness of the polycarbonate layer, preferably about 0.5 to about 0.7, with the overall thickness of the panel being about 0.75 inches to about 2.75 inches (about 1.9 cm to about 7.0 cm), preferably about 1.75 inches to about 2.25 inches (about 4.4 cm to about 5.7 cm), most preferably 2.0 inches (about 5.1 cm), and with the re-positioning of the bolts or other fasteners further away from the edge of the panel as described hereinabove, has a synergistic effect upon the blast and/or ballistics resistance of the panel, relative to its thickness. It is believed that this combination of material and overall thicknesses, combined with the positioning of the bolts, yields a surprising amount of blast and/or blast and ballistics resistance, than was previously known or even expected.

Figure 2:
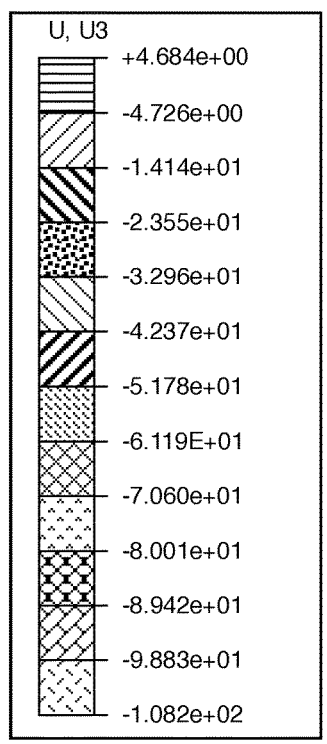
FIG. 2 shows a computer simulation of the laminate system of FIG. 1, after the system is subject to a simulated blast event, and showing various gradations of stress upon the panel.
Figure 2:
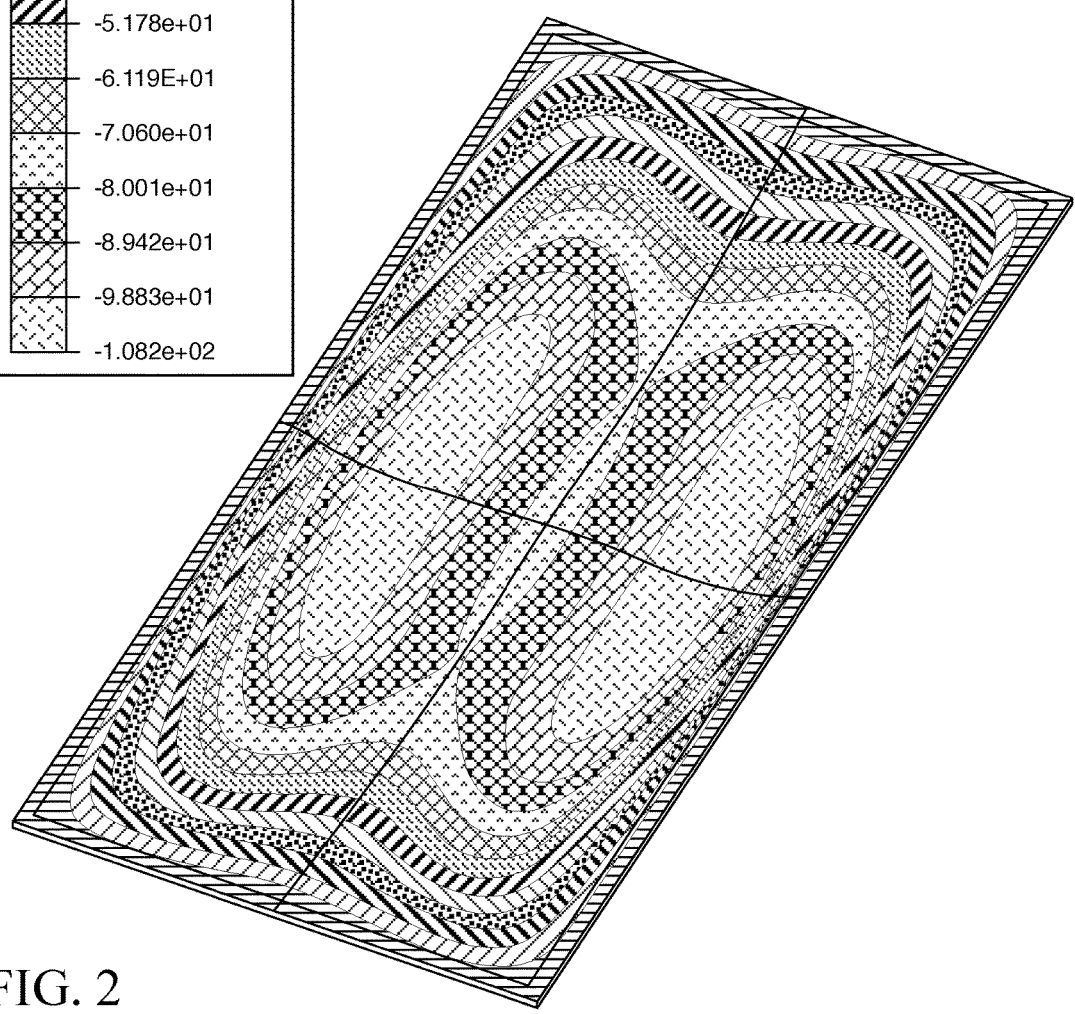
Figure 3:
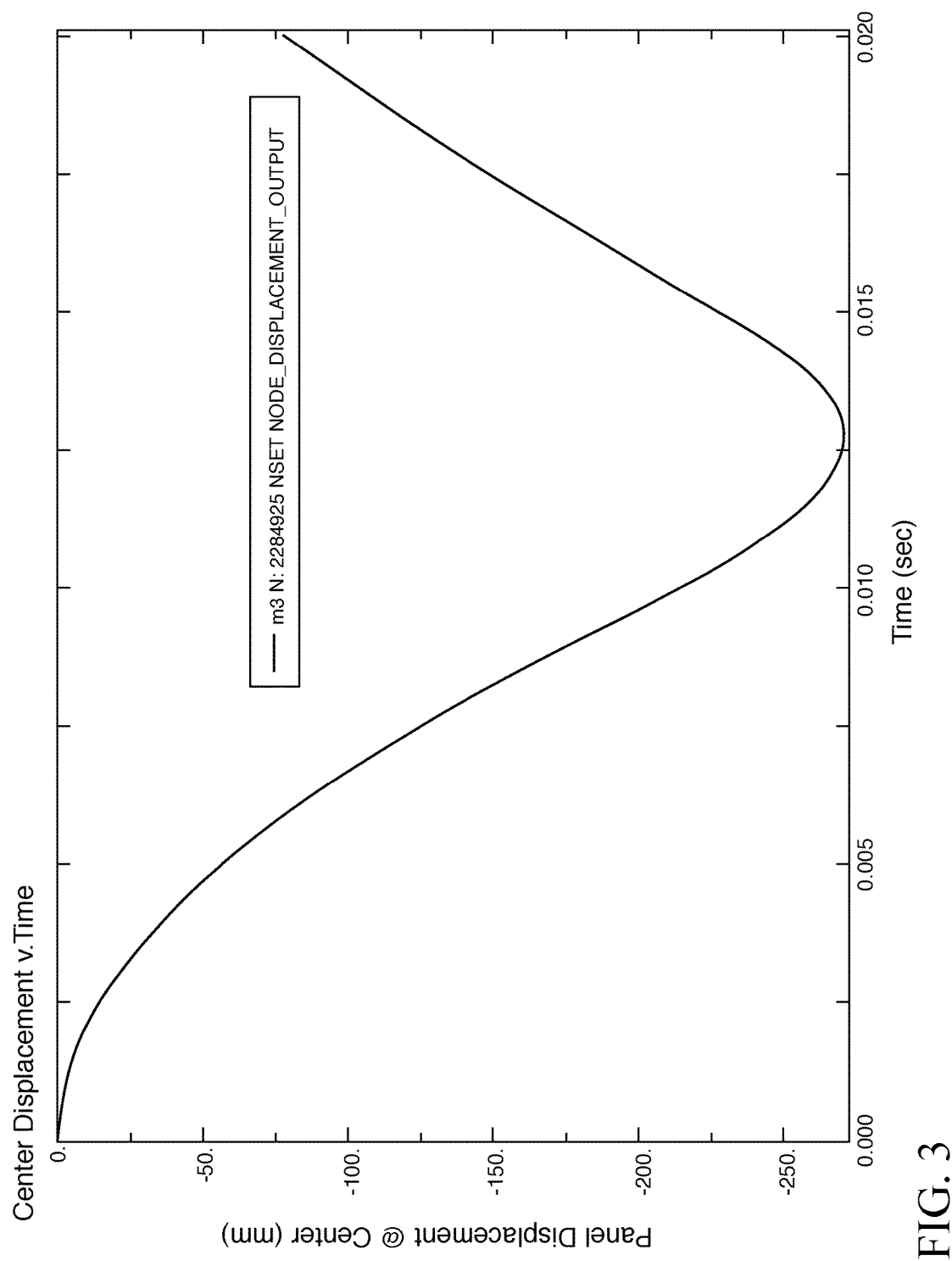
FIG. 3 shows a graph from the computer simulation of the laminate system of FIG. 1, depicting the panel's displacement at the center of the panel from its original position, during the time at and after the same simulated blast as in FIG. 2.

As shown in FIG. 1, bolts are attached to a panel of a thickness of the present invention. FIG. 2 is a computer simulation of a blast, which shows the stresses, and likely effect of such stresses, of the blast upon the panel shown in FIG. 1. As shown in FIG. 2, the panel is deformed by the blast in such a way, that it is believed the positioning of the bolts can make a critical difference as to whether or not a panel remains in place, and thus protects a building, as a result of the blast. FIG. 3 shows the successful panel bending, and not breaking or detaching, resulting from the blast simulation shown in FIG. 2.

Figure 4:
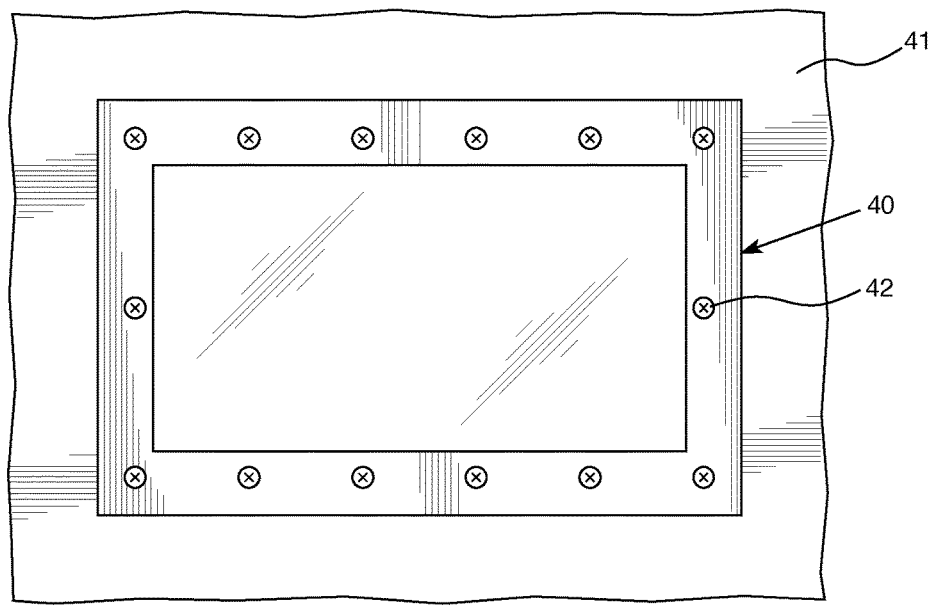
FIG. 4 shows a front view of a panel of the present invention attached to a building.
Figure 5:
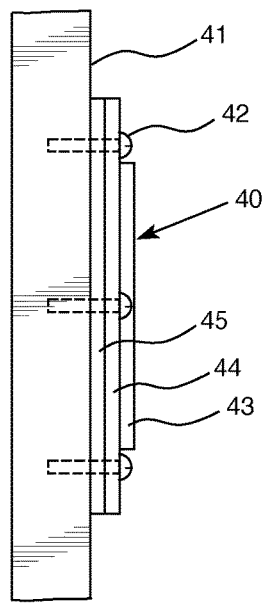
FIG. 5 shows a side view of the panel attached to the building depicted in FIG. 4.
Figure 6:
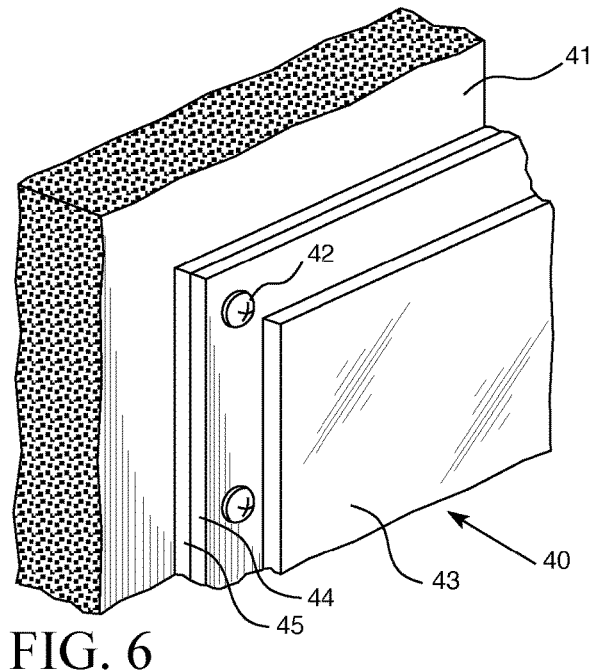
FIG. 6 shows a perspective view of a cut out of a corner of the panel attached to the building depicted in FIGS. 4 and 5.

As shown in FIGS. 4-6, panel 40 is secured to building 41 with fasteners 42. Panel 40 comprises glass layer 43, first polycarbonate sheet 44 and second polycarbonate sheet 45.

The glass-clad polycarbonate panel may also be comprised of asymmetric glass-clad, or insulated glass-clad panels. As noted above, each panel layer may further comprise one or more.

In the following preferred embodiments of the present invention are summarized:

Item 1. A blast-mitigating polycarbonate laminating system comprising:
  a polycarbonate sheet; and
  a glass layer;
  wherein at least a portion of the polycarbonate sheet is laminated to the glass layer, and wherein the thickness of the glass layer is between 0.25 and less than 1 times the thickness of the polycarbonate sheet, preferably 0.5 and 0.7 times the thickness of the polycarbonate sheet.

Item 2. The blast-mitigating polycarbonate laminating system of Item 1, wherein the polycarbonate sheet has a thickness between 1.9 cm and 2.1 cm.

Item 3. The blast-mitigating polycarbonate laminating system of any of Items 1-2, wherein the polycarbonate sheet and the glass layer are each components of a panel, and the panel has a thickness of 1.9 cm to 7 cm, preferably 4.4 cm to 5.7 cm.

Item 4. The blast-mitigating polycarbonate laminating system of any of Items 1-3, further comprising a second polycarbonate sheet.

Item 5. The blast-mitigating polycarbonate laminating system of any of Items 1-4, wherein the polycarbonate sheet and the glass layer are each components of a panel, and the system further comprises fasteners to attach the panel to a building, the fasteners located at a distance of 1.1x to 1.6x from the edge of the panel, preferably 1.2x to 1.5x from the edge of the panel, wherein x is the thickness of the panel.

Item 6. The blast-mitigating polycarbonate laminating system of any of Items 1-5, wherein the polycarbonate sheet and the glass layer are each components of a panel, and the system further comprises fasteners to attach the panel to a building, the fasteners located at a distance of 1.1x to 1.6x from another fastener, preferably 1.2x to 1.5x from another fastener, wherein x is the thickness of the panel.

What is claimed is:

1. A blast-mitigating polycarbonate laminating system consisting of:
  one or two polycarbonate sheets, one polycarbonate sheet having a first thickness; and
  one or more glass layers, one glass layer having a second thickness;
  optionally, an adhesive layer; and
  one or more fasteners to attach the panel to a building;
  wherein at least a portion of a polycarbonate sheet is laminated to a glass layer, wherein the second thickness is between 0.25 and less than 1 times the first thickness, wherein the one or two polycarbonate sheets and the one or more glass layers are each components of a panel having an edge and a thickness x, and wherein the fasteners located at a distance of 1.1x to 1.6x from either the edge of the panel or from another fastener.

2. The blast-mitigating polycarbonate laminating system of claim 1, wherein the second thickness is between 0.5 and 0.7 times the first thickness.

3. The blast-mitigating polycarbonate laminating system of claim 1, wherein the first thickness is between about ¾ and about 13/16 inches.

4. The blast-mitigating polycarbonate laminating system of claim 1, wherein the thickness x is about 0.75 inches to about 2.75 inches.

5. The blast-mitigating polycarbonate laminating system of claim 4, wherein, the thickness x is about 1.75 inches to about 2.25 inches.

6. The blast-mitigating polycarbonate laminating system of claim 1, wherein the one or two polycarbonate sheets is two polycarbonate sheets.

7. The blast-mitigating polycarbonate laminating system of claim 1, wherein the fasteners are located at a distance of 1.1x to 1.6x from the edge of the panel.

8. The blast-mitigating polycarbonate laminating system of claim 1, wherein the fasteners are located at a distance of 1.2x to 1.5x from the edge of the panel.

9. The blast-mitigating polycarbonate laminating system of claim 1, wherein the fasteners are located at a distance of 1.1x to 1.6x from another fastener.

10. The blast-mitigating polycarbonate laminating system of claim 1, wherein the fasteners are located at a distance of 1.2x to 1.5x from another fastener.

\* \* \* \* \*